US005386686A

United States Patent [19]
Chrëtien et al.

[11] Patent Number: 5,386,686
[45] Date of Patent: Feb. 7, 1995

[54] PROCESS FOR THE OPERATION OF A GAS TURBINE GROUP AND THE PRODUCTION OF AT LEAST ONE AIR GAS

[75] Inventors: Denis Chrëtien, Saint Mandé, France; Jean-Louis Girault, Liege, Belgium; Bernard Darredeau, Sartrouville, France

[73] Assignee: l'Air Liquide, Societe Anonyme Pour l'Etude et l'Exploitation des Procedes Georges Claude, Paris, France

[21] Appl. No.: 261,216

[22] Filed: Jun. 15, 1994

Related U.S. Application Data

[63] Continuation of Ser. No. 49,457, Apr. 16, 1993, abandoned.

[30] Foreign Application Priority Data

Apr. 29, 1992 [FR] France ............................. 92 05281

[51] Int. Cl.$^6$ ............................................. F02C 6/00
[52] U.S. Cl. .................... 60/39.02; 60/39.07; 60/39.29
[58] Field of Search ............... 60/39.02, 39.03, 39.07, 60/39.12, 39.29, 39.461, 39.465

[56] References Cited

U.S. PATENT DOCUMENTS

| | | | |
|---|---|---|---|
| 4,250,704 | 2/1981 | Bruckner et al. | 60/39.12 |
| 4,341,069 | 7/1982 | Bell et al. | 60/39.12 |
| 4,488,398 | 12/1984 | Noguchi | 60/39.12 |
| 4,557,735 | 12/1985 | Pike . | |
| 4,608,818 | 9/1986 | Goebel et al. | 60/39.12 |
| 5,231,837 | 8/1993 | Ha | 62/24 |

FOREIGN PATENT DOCUMENTS

| | | |
|---|---|---|
| 0081178 | 6/1983 | European Pat. Off. . |
| 0137152 | 4/1985 | European Pat. Off. . |
| 218741 | 4/1987 | European Pat. Off. . |
| 0402045 | 12/1990 | European Pat. Off. . |
| 410831 | 1/1991 | European Pat. Off. . |
| 0465193 | 1/1992 | European Pat. Off. . |
| 1274092 | 8/1968 | Germany . |
| 3706733 | 9/1987 | Germany . |
| 63-166916 | 7/1988 | Japan . |
| 2067668 | 7/1981 | United Kingdom ............... 60/39.12 |

*Primary Examiner*—Louis J. Casaregola
*Attorney, Agent, or Firm*—Young & Thompson

[57] ABSTRACT

Process for the operation of a gas turbine group (1) producing energy by combustion of a gaseous fuel (24) with a mixture of air gas. There is interconnected with the group (1) an air gas separation unit (7) producing at least two air gases (9; 10-13). The operating conditions of the turbine (3) of the group are maintained similar to those of maximum power production by selecting, with the aid of the separation unit (7), the parameters of the mixture of air gas. The combined assembly for the production of energy and at least one air gas comprises a gas turbine group (1), comprising a first compressor (2) coupled to a turbine (3) and a combustion circuit (5) between the outlet of the first compressor (2) and the inlet of the turbine (3); an air separation unit (7) comprising a second air compressor (14) connected to an air supply inlet (8) of the unit, an impure nitrogen outlet (9) and at least one other outlet (10-13) for an air gas; and structure (25, 26; 20, 23) selectively to connect the air inlet (8) to the outlet of the first compressor (2) or the impure nitrogen outlet (9) to the combustion circuit (5).

13 Claims, 1 Drawing Sheet

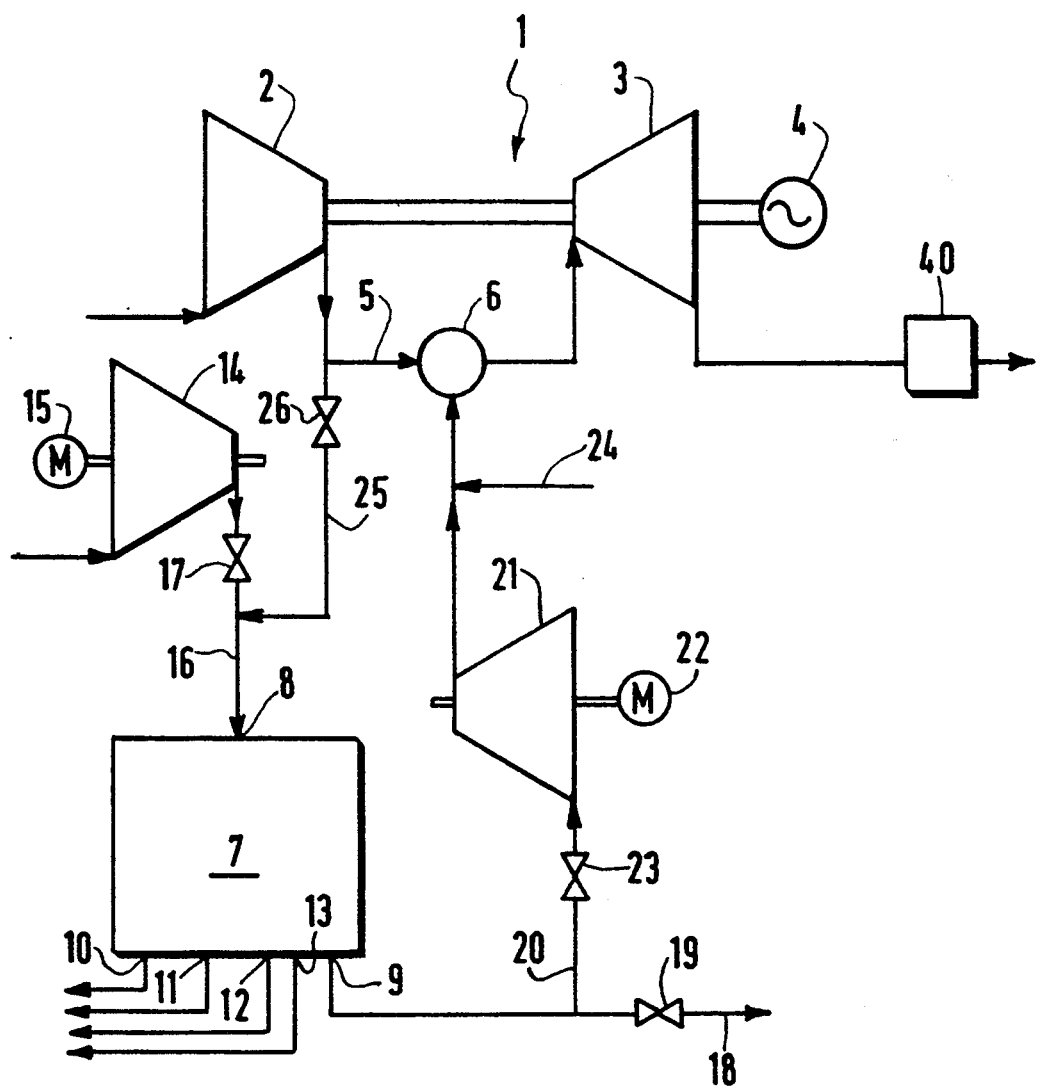

5,386,686

PROCESS FOR THE OPERATION OF A GAS TURBINE GROUP AND THE PRODUCTION OF AT LEAST ONE AIR GAS

This application is a continuation of application Ser. No. 08/049,457, filed Apr. 16, 1993, now abandoned.

FIELD OF THE INVENTION

The present invention relates to processes for the operation or use of a gas turbine group producing energy by combustion of a fuel with a mixture of air gas.

BACKGROUND OF THE INVENTION

A gas turbine group comprises an air compressor, a combustion circuit and an expansion turbine coupled to the compressor for driving this latter. The expansion work performed by the turbine being greater than the work of compression of the compressor, there results an energy balance used to drive a machine such as an alternator. The work delivered by the turbine depends in large part on the quantity of fumes generated during combustion and increases with this latter within limits compatible with the aerodynamic characteristics, also called "the hydraulic", of the turbine. On the other hand, the energy consumed by the compressor depends on the mass of flow rate of compressed air within the pumping limits of the compressor.

A gas turbine group represents a considerable investment which is not optimally used unless the compressor and the turbine each operate within optimum conditions. This optimum condition is rarely achieved insofar as in general one of the two elements is at its optimum capacity while the other is not, which is called the disequilibrium between the two elements, the most frequent case being that in which the turbine is, aerodynamically speaking, under-dimensioned relative to the compressor whose limits are more rapidly reached. Such disequilibrium can arise among other things from the fuel used or the climatic conditions of the utilization site. Thus, for the same thermal energy released, the flow rate of the fuels will vary considerably according to the gaseous fuels. The less is the lower calorific power (LCP) of the gas, the greater is the flow rate of fumes generated. For example, the combustion of a blast furnace gas will produce, for identical thermal energy, a greater flow rate of fumes than for natural gas, this latter having on the other hand, according to its origin, variable LCPs. With a large volume of fumes, the pressure at the intake of the turbine rises as well as, correlatively, that of the delivery of the compressor. Such a pressure increase can lead to the compressor being at its pumping limit. To limit the pressure increase, it suffices to withdraw compressed air between the outlet of the compressor and the combustion chamber. As to the variation of climatic conditions, temperature is the primary parameter. The higher the temperature, the less the capacity of the compressor. Conversely, the lower the temperature, the more the capacity of the compressor rises to the point of being able if desired to surpass the capacity of the turbine to accept a corresponding flow of fumes. It is thus frequent that the conditions of use of a same gas turbine group will be limited in winter by the turbine and in summer by the compressor. When analyzing these phenomena, the applicant has discovered that it was possible to reestablish equilibrium between the turbine and the compressor by withdrawing air at the outlet of the compressor in the case in which the operation of the group is limited by the turbine, or by injecting a supplemental flow of gas into the combustion line in the case in which the operation of the group is limited by the compressor, which thus permits compensating the disequilibra between these two elements, resulting either in the conception of these latter, or in the variations of fuel, or in each case, variations of climatic conditions, and thus to use the turbine at its maximum power.

SUMMARY OF THE INVENTION

The present invention therefore has for an object a process for operating a gas turbine group permitting utilizing the gas turbine at its maximum power no matter what the conditions of use.

To do this, according to a characteristic of the invention, the gas turbine group is functionally associated with an air separation unit and operating conditions of the turbine are maintained substantially similar to those of maximum power production by selecting, with the help of the separation unit, the parameters of the mixture of air gas introduced into the combustion chamber.

According to the characteristics of the invention, the selection is effected as a function of the climatic conditions, as a function of the fuel used and/or as a function of the aerodynamic characteristics of the compressor/turbine couple of the gas turbine group.

According to other characteristics of the invention, the selection is effected by withdrawing a flow of compressed air at the outlet of the compressor of the gas turbine group to supply at least partially the air separation unit or by introducing impure nitrogen produced by the air separation unit into the air gas mixture supplied to the combustion chamber.

With such a process, the selection of the parameters of the air gas mixture takes place by using an air gas separation unit which, in all cases, supplies other products (or byproducts) as compared to the use of the gas turbine group but having in themselves a substantial added value, such as oxygen, substantially pure nitrogen, argon and/or krypton-xenon mixtures.

The present invention has for another object to provide a combined assembly for the production of energy and at least one air gas permitting optimum utilization, for the production of energy, of the gas turbine group while supplying a range of air gas used independently of the operation of the gas turbine group.

To do this, according to a characteristic of the invention, such a combined assembly, comprising a gas turbine group comprising a first compressor coupled to a turbine and a combustion circuit between the outlet of the first compressor and the inlet of the turbine, and an air separation unit comprising a second air compressor connected to a supply air inlet of the unit, an impure nitrogen outlet and at least one other air gas outlet, is characterized in that it comprises means selectively to connect the air inlet of the unit to the outlet of the first compressor or the impure nitrogen outlet of the combustion circuit of the gas turbine group.

Thus, according to the conditions of use of the gas turbine group, the separation unit operates by being alternatively supplied by its own air compressor or at least partially by the gas turbine group air compressor for, particularly according to the season, supplying an additional flow of impure oxygen to the combustion line when the element limiting the operation of the gas turbine group is the compressor.

BRIEF DESCRIPTION OF THE DRAWING

Other characteristics and advantages of the present invention will become apparent from the following description of an embodiment given by way of illustration but not limitation, with respect to the accompanying drawing, in which:

the single FIGURE shows schematically a combined assembly for the production of energy and of air gas according to the invention.

DETAILED DESCRIPTION OF THE INVENTION

In the single FIGURE will be seen a gas turbine group 1 comprising conventionally a multi-stage compressor 2 coupled to a multi-stage turbine 3 driving conventionally an alternator 4, a combustion line 5, comprising a combustion chamber 6, connecting the outlet of compressor 2 to the turbine 3. The fumes expanded at the outlet of the turbine 3 are evacuated, preferably via boiler 40 for recovery of the heat of the fumes especially for actuating a steam turbine. The assembly also comprises an air separation unit 7, conventionally a cryogenic unit comprising at least one distillation column, comprising an air inlet 8 for supply of compressed air, an impure nitrogen outlet 9, at least one of the following outlets: a product oxygen outlet 10, a substantially pure product nitrogen outlet 11, an argon outlet 12, and, as the case may be, an outlet 13 for a mixture of krypton and xenon. The unit 7 has its own air compressor 14 driven by a motor 15 and connected to the air inlet 8 by a compressed air line 16 comprising a regulating valve 17.

According to the invention, the impure nitrogen outlet 9 is connected to an impure nitrogen line 18 comprising a valve 19 upstream of which is branched a line 20 connected to the combustion chamber 6, incorporating a nitrogen compressor 21 driven by a motor 22 and including, upstream of the compressor 21, a valve 23. Typically, a supply conduit for gaseous fuel 24 opens into the downstream portion of the line 20 a little before the combustion chamber 6. The gaseous fuel 24 is typically natural gas, but could also be a blast furnace gas, a gas resulting from the gasification of carbonaceous products (lignite, heavy petroleum residue, biomass) or a Corex gas obtained by the direct reduction processes of iron ore. A second line 25, comprising a valve 26, connects moreover the combustion line 5, upstream of the combustion chamber 6, and the line 16, downstream of the valve 17.

The operation of the assembly shown in the single drawing, for practicing the process according to the invention, such as set forth above, is the following:

Case in which the capacities of the turbine exceed those of the compressor (for example in summer or with a fuel of low LCP)

In this case, the valve 26 is closed so that all the compressed air leaving the compressor 2 will be sent to the combustion chamber 6. The valve 17 is open and the unit 7 is supplied only by its own compressor 14, independently of the compressor 2 of the gas turbine group 1. By contrast, the valve 19 is closed and the valve 23 is open and the compressor 21 is driven by the motor 22 to pump impure nitrogen available at the outlet 9, into the combustion chamber 6, mixed with the fuel 24, substantially at the delivery pressure of the compressor 2, thereby increasing the mass flow of fumes sent to the turbine 3, without involving disturbances of the combustion arising from the fact that the compressed air supplied by the compressor 2 is always very much in stoichiometric excess, this injection of nitrogen cooling moreover the combustion, which reduces substantially the nitrogen oxides produced by combustion.

Case in which the optimum operation of the gas turbine group is limited by the turbine (for example with a low ambient temperature)

In this case, the valve 23 is closed, the compressor 21 not driven and the outlet valve 19 is open. On the other hand, the valve 26 is open, the valve 17 being partially open according to the flow rate susceptible of being withdrawn at the outlet of the compressor 2 and replacing at least partially the compressed air flow normally supplied by the compressor 14. The combustion chamber 6 receives only the portion of the flow supplied by the compressor 2 which is compatible with the volume of fumes that can be accepted by the turbine 3 for optimum operation of this latter.

According to the conditions of use, and particularly the needs for the energy supplied by the gas turbine group, the two cases above can be combined in favor, this time, of optimum production of air gas by the separation unit 7.

Although the present invention has been described with regard to particular embodiments, it is not thereby limited but is on the contrary susceptible of modifications and variations which will be apparent to those skilled in the art.

What is claimed is:

1. A method of operating a gas turbine group comprising at least a first air compressor and at least one gas turbine employing combustion gases produced by a combustor burning fuel with a selected mixture of gas components from air, the gas turbine group coupled operationally to at least one air separation unit producing at least one of said gas components from air, comprising adjusting the composition of the selected mixture in dependence of at least the temperature of ambient air of the gas turbine group so as to cause the gas turbine to operate around a design point.

2. The method of claim 1, wherein the selected mixture consists essentially of nitrogen and oxygen.

3. The method of claim 2, wherein the composition of the selected mixture is adjusted by introducing nitrogen supplied by the air separation unit.

4. The method of claim 3, wherein the composition of the selected mixture is adjusted by withdrawing part of compressed air compressed in the first air compressor to supply feed air to the air separation unit.

5. The method of claim 3, further comprising selectively operating a second air compressor to supply feed air to the air separation unit.

6. The method of claim 4, further comprising selectively operating a second air compressor to supply feed air to the air separation unit.

7. The method of claim 5, comprising further extracting from the air separation unit at least a second of said gas components from air.

8. The method of claim 3, comprising compressing the nitrogen supplied by the air separation unit before mixing into the selected mixture.

9. A method of operating a power gas turbine comprising at least one gas turbine employing combustion gases produced by a combustor burning fuel with a selected gas mixture comprising at least oxygen and nitrogen, comprising adjusting the nitrogen/oxygen ratio of the gas mixture in dependence of the ambient temperature.

10. The method of claim 9, wherein said ratio is decreased with a decrease of said ambient temperature.

11. The method of claim 9, wherein said combustor is fed with air under pressure and said ratio is modified by selectively introducing additional nitrogen into said combustor.

12. The method of claim 11, wherein said ratio is modified by modifying the flow rate of air supplied to the combustor.

13. A method of operating a gas turbine group comprising at least a first air compressor and at least one gas turbine employing combustion gases produced by a combustor burning fuel with a selected mixture of gas components from air, the gas turbine group coupled operationally to at least one air separation unit producing at least one of said gas components from air, comprising adjusting the composition of the selected mixture in dependence of at least the heating value of the fuel of the gas turbine group so as to cause the gas turbine to operate around a designed point.

* * * * *